United States Patent [19]

Taylor et al.

[11] Patent Number: 4,630,883
[45] Date of Patent: Dec. 23, 1986

[54] OPTICAL WAVEGUIDE APPARATUS AND METHOD FOR MANUFACTURING

[75] Inventors: Henry F. Taylor, Alexandria; George H. Sigel, Great Falls; Michael E. Gingerich, Woodbridge, all of Va.

[73] Assignee: The United States of America as represented by the Secretary of the Navy, Washington, D.C.

[21] Appl. No.: 480,966

[22] Filed: Mar. 21, 1983

[51] Int. Cl.⁴ .................................................. G02B 6/26
[52] U.S. Cl. .................................. 350/96.15; 350/96.16
[58] Field of Search ........................... 350/96.15, 96.16

[56] References Cited

U.S. PATENT DOCUMENTS

| | | | |
|---|---|---|---|
| 3,526,880 | 9/1970 | Filipazzi | |
| 3,874,779 | 4/1975 | Thiel | 350/96 |
| 4,013,000 | 3/1977 | Kogelnik | |
| 4,113,353 | 9/1978 | Matsushita | 350/171 |
| 4,176,908 | 12/1979 | Wagner | 350/96.15 |
| 4,234,969 | 11/1980 | Singh | 350/96.16 |
| 4,285,571 | 8/1981 | Winzer | 350/96.18 |
| 4,296,995 | 10/1981 | Bickel | 350/96.15 |
| 4,306,765 | 12/1981 | Winzer et al. | 350/96.16 |
| 4,521,069 | 6/1985 | Ikeda | 350/96.15 X |

FOREIGN PATENT DOCUMENTS

| | | | |
|---|---|---|---|
| 3008106 | 9/1981 | Fed. Rep. of Germany | 350/96.15 |
| 0122134 | 9/1979 | Japan | 350/96.15 |
| 0019002 | 2/1981 | Japan | 350/96.15 |

*Primary Examiner*—William L. Sikes
*Assistant Examiner*—Akm E. Ullah
*Attorney, Agent, or Firm*—Sol Sheinbein; Vincent T. Pace

[57] ABSTRACT

A device and method for interconnecting multiterminal electronic devices. The device and method combine the use of input light sources, output light detectors and an optical waveguide matrix device for routing the signals from various preselected input terminals to various other output terminals. The optical waveguide matrix device includes a number of intersecting optical waveguides formed on a base. The intersecting waveguides are optically coupled by means of reflecting surfaces formed at the nodes of intersection.

21 Claims, 9 Drawing Figures

OPTICAL WAVEGUIDE APPARATUS AND METHOD FOR MANUFACTURING

BACKGROUND OF THE INVENTION

The subject invention relates generally to optical waveguides, and more particularly to a method and means which utilize optical waveguides in a matrix configuration for interconnecting multiterminal electronic devices.

Traditionally, wire or printed circuit interconnections have been used for the transmission of data signals between electronic devices (e.g. circuit boards). Such hardwire connections, however, are rather severely limited in data rate handling, usually being limited to less than 1 megabit/second. Furthermore, they tend to suffer from the pick-up of stray RF signals and are subject to other types of electromagnetic radiation induced problems (e.g. EMP). Likewise hardwire data links can also be a source of unwanted RF electromagnetic radiation themselves. Furthermore, since hardwire interconnections are electrically conductive, severe design problems can arise when interconnecting different transistor or IC families (e.g. CMOS, MOS, TTL, etc.) having different logic level voltages.

One answer to this problem is the use of optical fibers as the data signal links. Optical fiber data links have very high bandwidth and neither pick-up nor radiate RF signals. However, there are drawbacks to the use of optical fibers as data transmission links. Interconnecting large numbers of terminals on circuit boards with individual fibers becomes impractical due to the constrained space available for such interconnections. Also, each optical fiber would have to be connected individualy, a slow and time consuming procedure. Thus, assembly would be difficult, leading to high cost and poor reliability.

There have been some attempts to overcome these constraints in the use of optical data links. One approach has been to arrange the optical waveguides in a matrix configuration which would be capable of handling a multitude of data links. This is the approach taken by the subject invention. There have been a number of attempts to utilize the optical waveguide matrix as a means for optically transmitting data on other signals. However, all, for one reason or another, have been deficient in some respect.

U.S. Pat. No. 4,306,765, Winzer et al. discloses one type of optical waveguide matrix. However, the device is limited to seven channels. Although it is conceivable that a device with more channels could be constructed based on the disclosure, the cost of larger capacity devices would become prohibitive since Winzer et al. uses optical fibers or rods as the waveguides. These fibers or rods must be cut and their ends polished at the reflecting joints. Furthermore, Winzer et al. requires a layer of partially-transmissive/partially reflective material which adds to the cost and complexity of the device.

The optical coupler disclosed in U.S. Pat. No. 4,234,969, Singh, utilizes optical waveguides in a matrix configuration to couple data signals into and out of an optical data transmission bus. However, the coupler employs a multitude of optical devices including tapered waveguides, partially reflecting layers, and prisms. The patent discloses a 2×2 matrix coupler, but because of the complexity of the arrangement of the waveguides and reflecting surfaces, the device would not be suitable for interconnecting large numbers of data terminals.

U.S. Pat. No. 4,013,000, Kogelnik, discloses an Optical Crossbar Switching Network. This device, although an optical waveguide matrix of sorts, utilizes switchable (grating-type evanescent field) couplers for routing the optical signals between crossing waveguides. Due to the expense of switchable couplers, the switching network disclosed in Kogelnik would not be suitable for low-cost, high-production optical connecting devices.

A major concern in the development of any optical waveguide interconnection matrix is the coupling of the light signal from one waveguide into a crossing waveguide. The current methods for accomplishing this coupling are all rather complex and could be prohibitively expensive when required in large scale. U.S. Pat. Nos. 4,296,995 (Bickel), 4,285,571 (Winzer), 4,176,908 (Wagner), and 3,874,779 (Thiel) all disclose ways and means of coupling optical waveguides. The coupling methods disclosed, however, involve either special processing of the waveguide ends, the insertion of additional optical devices such as prisms and lenses, or the insertion of partially reflective layers of material between the waveguide ends.

In light of the foregoing discussion, it can be aptly concluded that at present there is no simple, inexpensive way to optically interconnect a multitude of data links which is suitable for mass production.

OBJECTS OF THE INVENTION

Accordingly, one object of the subject invention is to optically interconnect a plurality of devices for the transmission of signals therebetween.

Another object of this invention is to simplify the construction of and thus facilitate the mass production of optical waveguide interconnection devices.

It is a further object of this invention to interconnect a multitude of optical data links with high reliability yet low cost.

SUMMARY OF THE INVENTION

The above and other objects are realized in the present invention which comprises a matrix of intersecting optical waveguides on a base. In order to couple the light, between optical waveguides, reflecting surfaces are formed at the nodes where the waveguides cross. These reflecting surfaces cause light traveling in one waveguide to be deflected into a crossing waveguide by the principal of total internal reflection. In one embodiment the reflecting surfaces are formed by making cuts only through the waveguide material at preselected nodes so as to program the routing between the input and output terminals.

The optical waveguide matrix described above can be used in an apparatus for interconnecting multiterminal electronic devices (e.g. microprocessors). This interconnection apparatus, in one embodiment may include a number of input light sources adjacent to one set of waveguides, a number of output light detectors positioned adjacent to another set of waveguides, and means for connecting these input light sources and output light detectors to multiterminal electronic devices. The interconnections can be programmed by proper selection of the nodes where reflecting surfaces are to be formed.

As an added feature, the optical waveguide matrix, and hence the interconnection device, can be vertically coupled with other optical waveguide matrices by means of reflecting surfaces formed in the waveguide which will cause light beams to be deflected out of the optical waveguide matrix. In this way, the input/output permutations are substantially multiplied.

Other objects, advantages, and novel features of the invention will become apparent from the detailed description of the invention which follows the accompanying drawings.

DESCRIPTION OF THE PREFERRED EMBODIMENT

Figure 1:
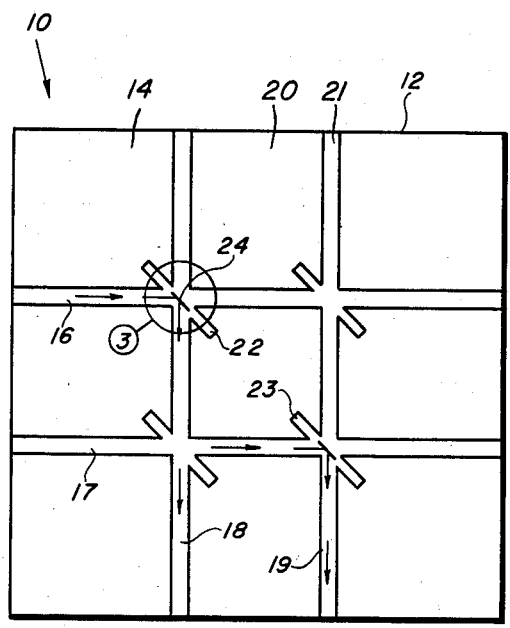
FIG. 1 is a plan view of one embodiment of the optical waveguide matrix.

Referring now to the drawings, wherein like reference characters designate identical or corresponding parts throughout the several views, and more particularly to FIG. 1 thereof, there is shown generally an optical waveguide matrix 10. The optical waveguide matrix 10 includes a base 12 which has at least one flat surface 14.

The base 12 may be made of any solid material. Although the base 12 shown was made of brass, the actual material used will depend on the application and other factors (e.g. electrical conducting or insulating capability). The base 12 may be in the form of a rectangular parallelepiped as depicted in FIG. 1, although other geometries are of course possible.

A matrix of intersecting optical waveguides is formed in the base 12. In the embodiment shown in FIG. 1 this matrix is realized by a first set of grooves, 16 and 17, and a second set of grooves, 18 and 19, which are mutually orthogonal. Orthogonality is not required however, and other arrangements are possible. The optical waveguides are themselves formed by placing a dielectric waveguide material, such as plastic or silicone rubber, in grooves which have been formed in the flat surface 14 of the base 12.

Figure 2:
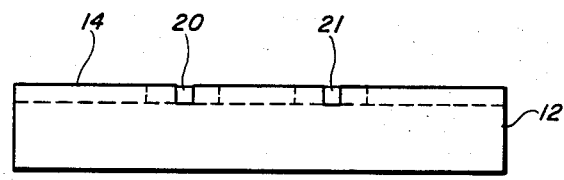
FIG. 2 is a side view of the embodiment of the optical waveguide matrix of FIG. 1.

The optical waveguides formed in grooves 16,17,18, and 19 may terminate in ends, such as 20 and 21 as shown in FIG. 2. These ends 20 and 21 are located on the sides of the base 12. In FIG. 2 these ends are shown as having rectangular cross sections, but they may also have other useful geometries depending on the particular application.

Recesses 22 and 23 may be formed in the surface 14 of the base 12 across the intersection nodes of the optical waveguides 16, 17, 18, and 19. These recesses, 22 and 23, would be oriented at an angle relative to the waveguides 16, 17, 18 and 19. The waveguides are cut along the longitudinal axes of the recesses.

Figure 3:
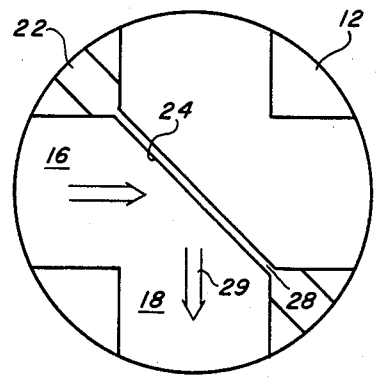
FIG. 3 is an expanded view of the reflecting surface which couples two of the crossing waveguides shown in FIG. 1.

As shown in FIG. 1 and in the expanded view of FIG. 3, a reflecting surface 24 is formed between the dielectric waveguide material 16 and the ambient air 28 when the waveguides, such as 16 and 18, are cut. Proper selection of the angle of the cut relative to the waveguides 16 and 18 by Snell's law, will cause a light beam 29 traveling in one of the waveguides 16 to be deflected into a crossing waveguide 18 by the principle of total internal reflection.

The embodiment shown in FIG. 1 is a 2×2 optical waveguide matrix, but it can be seen easily that the matrix could be N×N where N is any whole number. Furthermore, if, in FIG. 3, the waveguide material is cut only partly through, then only a fraction of the light beam 29 will be deflected. The remainder will continue to travel in the original direction. In this manner it would be possible to make an N×M or M×N matrix, where M is any whole number not equal to N. This is possible because the light traveling in any one waveguide could be deflected into more than one crossing waveguide.

Figure 4:
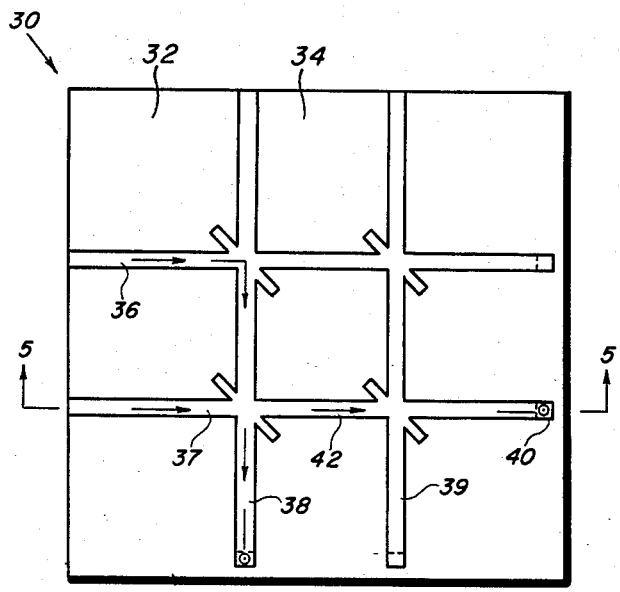
FIG. 4 is a plane view of a second embodiment of the optical waveguide matrix.

Another embodiment of the optical waveguide matrix 30 is shown generally in FIG. 4. It can be seen that this embodiment is somewhat like that shown in FIG. 1 in that it has a base 32, at least one flat surface 34 and a matrix of optical waveguides 36, 37, 38, and 39. However, the optical waveguide matrix 30 of FIG. 4 has a reflecting surface 40 at an end of one of the waveguides 37.

The reflecting surface 40 is disposed at such an angle (see FIG. 5) so as to cause a light beam 42 traveling in the waveguide 37 to be deflected out of the optical waveguide matrix 30. The reflecting surface 40 may be formed in a number of ways. For example, the dielectric waveguide material 41 may be cut at an angle relative to the flat surface 34, or a reflective surface 40 may be machined into the base 32 as shown in FIG. 5.

Figure 5:
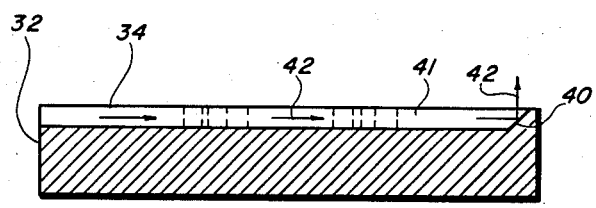
FIG. 5 is a sectional side-view of the embodiment of the optical waveguide matrix shown in FIG. 4.

It should be noted that although FIGS. 4 and 5 show the light beam 42 emerging at an angle which is normal to the flat surface 34, the angle of emergence can be varied merely by changing the pitch of the reflecting surface 40 relative to the flat surface 34.

Figure 6:
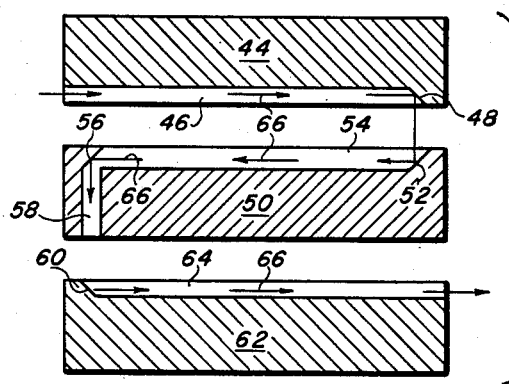
FIG. 6 is a sectional side-view of three of the possible embodiments of the optical waveguide matrix illustrating their facility for vertical interconnection.

FIG. 6 shows how an optical waveguide matrix 44 might be vertically interconnected with other optical waveguide matrices 50 and 62. Optical waveguide matrix 44 has at least one horizontal waveguide 46 with a reflecting surface 48. Optical waveguide matrix 44 is stacked over another optical waveguide matrix 50 which also has at least one horizontal waveguide 54 with at least one reflecting surface 52. The reflecting surface 52 must be aligned with the reflecting surface 48.

In addition, optical waveguide matrix 50 may have a second reflecting surface 56 in the horizontal waveguide 54, which couples the horizontal waveguide 54 into a vertical waveguide 58. Optical waveguide matrix 50 may itself be stacked over a third optical waveguide matrix 62 which has at least one horizontal waveguide 64 having at least one reflecting surface 60 therein. The reflecting surface 60 must be aligned with the vertical waveguide 58.

The result of this kind of stacking is that a light beam 66 traveling in horizontal waveguide 46 is reflected into horizontal waveguide 54 by the reflecting surfaces 48 and 52. The light beam 66 is then reflected from the horizontal waveguide 54 into the vertical waveguide 58. Via the vertical waveguide 58, the light beam 66 emerges from the optical waveguide matrix 50 and enters the optical waveguide matrix 62. Upon entering the optical waveguide matrix 62, the light beam 66 is reflected by the reflecting surface 60 into the horizontal waveguide 64.

It can be seen that several optical waveguide matrices may be stacked in the described manner and so be vertically interconnected. Thus it would be possible to select an even greater number of possible input/output arrangements of interconnections among the optical waveguides.

Figure 7:
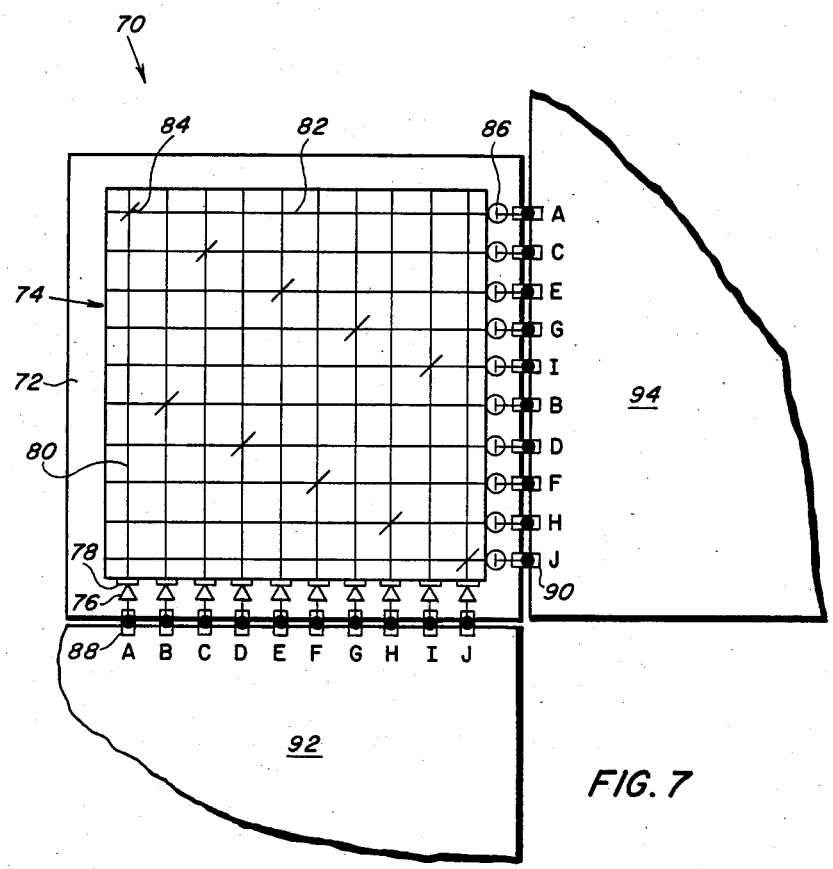
FIG. 7 illustrates one possible embodiment of the optical waveguide matrix interconnection device.

FIG. 7 depicts a possible embodiment of an optical waveguide matrix interconnection device 70 and how it could be used to interconnect electronic devices such as 92 and 94. The optical waveguide matrix interconnection device 70 includes a mounting base 72 and an optical waveguide matrix 74.

Input light sources 76, such as light emitting diodes or laser diodes, are positioned adjacent to input waveguides 80. Light collimators (e.g. optical lenses) 78 may be placed between the input light sources 76 and the input waveguides 80. Output light receivers 86, such as photoelectric cells, are positioned adjacent to output waveguides 82.

Reflecting surfaces 84, formed at the intersection nodes of the input waveguides 80 and output waveguides 82, can be arranged to form any desired routing of the light signals from said input light sources 76 to the output light detectors 86.

The input light sources 76 are connected to the terminals of electronic device 92 by electrical connection means 88, such as clips, wire links, solder, etc. Output light detectors 86 are likewise connected to electronic device 94 by electrical connection means 90. In this manner electronic signals at the terminals of electronic device 92 are converted into light signals by input light sources 76. These light signals are then routed through the optical waveguide matrix 74 to the output light detectors 86. There, the light signals are converted back to electronic signals by the output light receivers 86, for input to electronic device 94.

As can be seen from the embodiment depicted in FIG. 7 the arrangement of interconnections between input light sources 76 and output light receivers 86 can be made completely arbitrary by proper selection of the nodes at which the reflecting surfaces 84 are to be formed.

Figure 8:
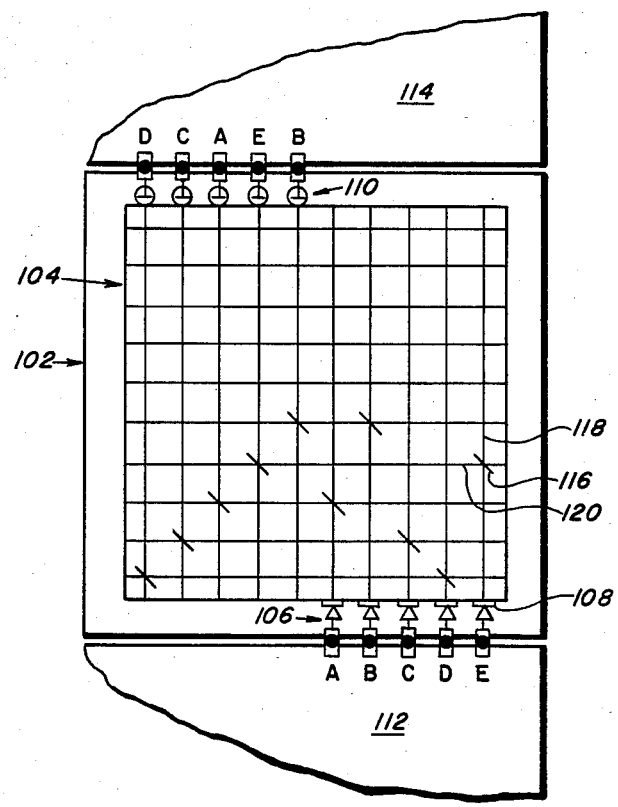
FIG. 8 illustrates a second possible embodiment of the optical waveguide matrix interconnection device.
Figure 9:
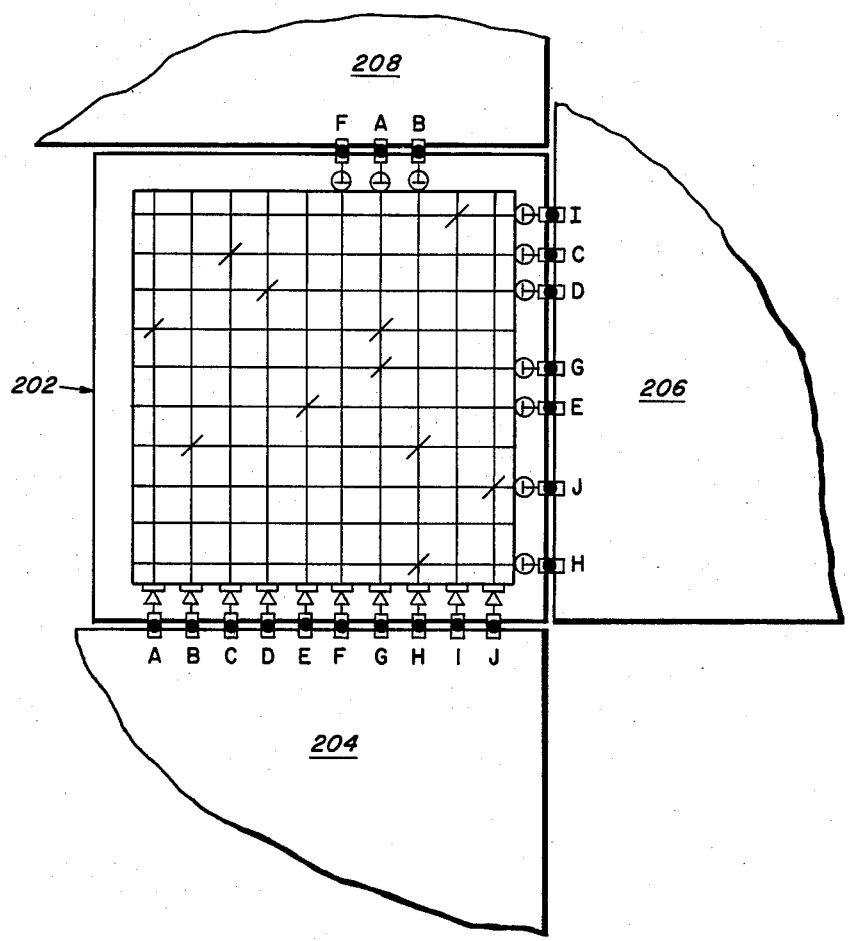
FIG. 9 illustrates a third possible embodiment of the optical waveguide matrix interconnection device.

FIGS. 8 and 9 illustrate two of the possible alternative arrangements for interconnection of electronic devices utilizing the optical waveguide matrix interconnection device.

FIG. 8 shows an embodiment of the optical waveguide interconnection device 102 being used to connect electronic devices 112 and 114 which are on opposite sides of the optical waveguide interconnection device 102. It can be seen that in this embodiment the optical waveguide matrix 104 has reflecting surfaces 116 arranged so as to couple waveguides, such as 118 and 120.

In this manner the sequence of the input terminals such as 106 (A, B, C, D, E) is transposed at the output terminal 110 (D, C, A, E, B). This transposition is accomplished by proper selection of the location of the reflecting surfaces, such as 116.

FIG. 9 illustrates another possible embodiment of the optical waveguide matrix interconnection device 202. In this embodiment the optical waveguide matrix interconnection device 202 is arranged so as to interconnect three devices: 204, 206 and 208.

The embodiments depicted in FIGS. 7, 8 and 9 are in no way the only possible alternatives for the optical waveguide interconnection device. They are illustrated merely to demonstrate the versatility of the interconnection device so that its operation may be understood more clearly. Numerous additional modifications and variations of the present invention are possible in light of the above descriptions. It is therefore to be understood that within the scope of the claims which follow, the invention may be practiced otherwise than as specifically described herein.

What is claimed and desired to be secured by Letters Patent of the United States is:

1. An optical waveguide matrix comprising:
   a base having
      a plurality of sides and
      at least one major surface which has
         a plurality of intersecting grooves,
            said grooves being arranged such that a matrix of intersecting grooves is thereby formed on said base, with at least some of said intersecting grooves extending between different sides of said base,
            said matrix having a plurality of nodes where said intersecting grooves cross each other;
   a dielectric waveguide material in said grooves such that a matrix of intersecting light waveguides is formed in the base,
      said waveguides having ends at the sides of said base,
      said waveguides also having cuts made after and not contemporaneous with the manufacture of the base and waveguides at some but not all nodes; each cut forming a slot in the waveguide material that does not extend significantly into the base; and
   a plurality of reflecting surfaces formed by said cuts at said nodes,
   whereby a light beam traveling in any one of said waveguides may be deflected into at least one intersecting waveguide.

2. An optical waveguide matrix as recited in claim 1 wherein the major surface has a plurality of recesses extending only a small distance into said base, cut across the nodes, said recesses having longitudinal axes oriented such that they form angles with the grooves, and the cuts in the waveguides are axially aligned with said recesses.

3. An optical waveguide matrix as recited in claim 2 wherein the base is in the general form of a parallelepiped whose thickness is substantially smaller than its length or width whereby said parallelepiped will have two major flat surfaces.

4. An optical waveguide matrix as recited in claim 3 wherein the matrix of intersecting grooves comprises one of the major flat surfaces having a first set of parallel grooves, and a second set of parallel grooves orthogonally intersecting said first set of grooves.

5. An optical waveguide matrix as recited in claim 4 wherein the first set of grooves is parallel to one side of the major flat surface.

6. An optical waveguide matrix as recited in claim 5 wherein the longitudinal axes of said recesses form 45° angles with said first and second set of grooves.

7. An optical waveguide matrix as recited in claim 6 wherein the waveguides have only partial cuts such that a portion of the light will be deflected into an intersecting waveguide while the remainder will be transmitted through in the original direction.

8. An optical waveguide matrix as recited in claim 1 further comprising means for causing light beams traveling in any of the waveguides to be deflected in a direction out of a plane determined by the major surface of the base.

9. An optical waveguide matrix as recited in claim 8 wherein the means for causing the light beams to deflect comprises the waveguides having cuts therein, said cuts being located away from the nodes of the matrix, said cuts thereby forming reflecting surfaces in the waveguides, said reflecting surfaces being oriented at some angle relative to the major surface of the base.

10. An optical waveguide matrix as recited in claim 8 wherein the means for causing the light beams to deflect comprises angled surfaces within the grooves such that reflecting surfaces are formed where the waveguide material interfaces with said angled surfaces.

11. An optical waveguide matrix comprising:
a base having
a plurality of sides and at least one flat surface having
a first set of parallel grooves, said first set of grooves also being parallel to one of the sides of said base, and a second set of parallel grooves orthogonally intersecting said first set of grooves, whereby
a matrix is formed on said flat surface,
said matrix having a plurality of nodes where said first and second sets of grooves intersect,
said flat surface also having a plurality of recesses cut across said nodes,
said recesses extending only a small distance into said base and having longitudinal axes oriented such that they form 45° angles with said first and second sets of grooves;
a dielectric material disposed in said first and second sets of grooves such that a matrix of orthogonally intersecting light waveguides is formed,
said waveguides having ends at the sides of said base,
said waveguides also having cuts at some but not all nodes, each cut being at and axially aligned with a given recess and forming a
slot in the waveguide material that does not extend significantly into the base;
a plurality of reflecting surfaces formed by said cuts in said waveguides, whereby a light beam traveling in any one of said waveguides may be deflected into at least one intersecting waveguide.

12. An optical waveguide matrix as recited in claim 11 wherein the waveguides have partial cuts such that a portion of the light will be deflected into an intersecting waveguide while the remainder will be transmitted through in the original waveguide.

13. An optical waveguide matrix as recited in claim 11 further comprising means for causing light beams traveling in any of the waveguides to be deflected in a direction out of a plane determined by the flat surface of the base.

14. An optical waveguide matrix as recited in claim 13, further comprising:
a plurality of input light sources positioned adjacent to the ends of the waveguides along at least one side of the optical waveguide matrix, and
a pluraltiy of output light receivers positioned adjacent to the ends of the waveguides not occupied by input light sources,
whereby light from said input light sources may be transmitted through the optical waveguide matrix to preselected output light receivers.

15. An optical waveguide matrix as recited in claim 14, wherein said input light sources are light emitting diodes and said output light detectors are photodiodes.

16. An optical waveguide matrix as recited in claim 14, wherein said input light sources and said output light receivers are optical fibers.

17. An optical waveguide matrix as recited in claim 14, wherein
the input light sources further comprise means for connecting to a first electronic device and means for converting an electrical signal into a beam of light, and
the output light receivers further comprise means for converting an incident beam of light into an electrical signal and means for connecting to a second electronic device;
whereby electrical signals from said first electronic device are converted to light beams by said input light sources, said light beams are transmitted through the optical waveguide matrix to preselected output light receivers, whereupon said light beams are converted back to electrical signals for input to said second electronic device.

18. An optical waveguide matrix as recited in claim 17, further comprising means for collimating the beams of lgiht generated by said input light sources.

19. A method of manufacturing an optical waveguide apparatus for interconnecting multiterminal electronic devices, comprising:
cutting intersecting grooves on the surface of a carrier base;
inserting a dielectric waveguide material in said grooves;
cutting, without extending significantly into the carrier base, a slot in the dielectric material at some selected but not all intersecting points leaving an ambient air space to reflect the waves into an intersecting waveguide.

20. A method of manufacturing a waveguide apparatus as recited in claim 19, wherein said slot cutting step comprises the step of cutting said slots at a time which is after, but not contemperaneous with said steps of cutting intersecting grooves and inserting of said dielectric waveguide material.

21. A method of manufacturing a waveguide apparatus as recited in claim 20, whereby the dielectric material is selected from the group consisting of silicone-rubber and plastic.

* * * * *